(12) United States Patent
Wendeborn

(10) Patent No.: US 10,661,672 B2
(45) Date of Patent: May 26, 2020

(54) DOCKING STATION FOR THE MECHANICAL ALIGNMENT OF AN AUTONOMOUS ROBOTIC PLATFORM

(71) Applicant: Quantum Spatial, Inc., St. Petersburg, FL (US)

(72) Inventor: David Wendeborn, Portland, OR (US)

(73) Assignee: Quantum Spatial, Inc., St. Peterburg, FL (US)

(*) Notice: Subject to any disclaimer, the term of this patent is extended or adjusted under 35 U.S.C. 154(b) by 0 days.

(21) Appl. No.: 16/130,989

(22) Filed: Sep. 13, 2018

(65) Prior Publication Data

US 2019/0100109 A1    Apr. 4, 2019

Related U.S. Application Data

(60) Provisional application No. 62/565,993, filed on Sep. 29, 2017.

(51) Int. Cl.
*B60L 53/36* (2019.01)
*B60L 53/14* (2019.01)

(52) U.S. Cl.
CPC .............. *B60L 53/36* (2019.02); *B60L 53/14* (2019.02); *B60L 2200/40* (2013.01); *B60L 2260/32* (2013.01)

(58) Field of Classification Search
CPC .. B60L 53/36; B60L 2260/32; B60L 2200/40; B60L 53/14

USPC .................................................. 320/107, 115
See application file for complete search history.

(56) References Cited

U.S. PATENT DOCUMENTS

| 9,276,419 | B2 | 3/2016 | Borinato et al. | |
| 2005/0156562 | A1* | 7/2005 | Cohen | A47L 9/2857 320/107 |
| 2008/0028974 | A1 | 2/2008 | Bianco | |
| 2012/0102670 | A1* | 5/2012 | Jang | A47L 11/33 15/347 |
| 2017/0072558 | A1* | 3/2017 | Reynolds | G05D 1/0246 |
| 2018/0014709 | A1* | 1/2018 | O'Brien | A47L 9/2826 |
| 2018/0188737 | A1* | 7/2018 | Won | G05D 1/0225 |

* cited by examiner

*Primary Examiner* — Richard V Muralidar
(74) *Attorney, Agent, or Firm* — FisherBroyles, LLP

(57) ABSTRACT

Various embodiments are directed to a docking station for the mechanical alignment of an autonomous robotic platform. A correlator may receive the wheels of a moving autonomous robotic platform. A first set of rollers in the correlator may align the wheels, in a substantially linear direction, into a space created by a second set of rollers attached to a frame of a backstop. The second set of rollers may continue to align the wheels of the moving autonomous robotic platform until the wheels come in contact with a stopping roller coupled to the backstop. The stopping roller may be vertically oriented at a height above a wheel radius of the autonomous robotic platform. The stopping roller provides a force to prevent further forward travel. Upon being stopped by the stopping roller, the autonomous robotic platform is positioned for mating with charging contacts in the docking station.

17 Claims, 5 Drawing Sheets

DOCKING STATION FOR THE MECHANICAL ALIGNMENT OF AN AUTONOMOUS ROBOTIC PLATFORM

CROSS REFERENCE TO RELATED APPLICATION

This application claims the benefit of U.S. Provisional Application No. 62/565,993, filed Sep. 29, 2017, the disclosure of which is incorporated, in its entirety, by this reference.

TECHNICAL FIELD

Embodiments of the disclosure relate generally to a docking station for autonomous robots and more specifically to a docking station that facilitates the mechanical alignment of an autonomous robotic platform for charging operations.

BACKGROUND

Infrastructure facilities such as electrical substations and water utility facilities frequently require on-site inspection for maintenance and repair operations associated with the failure of individual components due to natural corrosion over time, defects, event-induced equipment breakage and/or equipment overloading that may cause major disruption to operations, loss of revenue, and significant replacement costs. Advances in autonomous technology have resulted in the increasing use of wheeled autonomous robotic platforms to carry out inspection tasks previously performed manually.

Autonomous robotic platforms, in performing their assigned inspection tasks, have a need for replenishing their power source which is usually accomplished by programming the platforms to dock with a power source for charging. Traditionally, autonomous robotic platforms utilize various localization sensors (e.g., GPS, imaging, LiDAR and/or SONAR sources) in addition to complex software to initiate a docking sequence with a charging system. The aforementioned sensors and software however, have varying levels of precision that often result in the inaccurate docking of autonomous robotic platforms. This problem is further exacerbated when autonomous robotic platforms are utilized in outdoor environments where various environmental factors (e.g., mud, snow, rain, gravel, etc.) may cause further errors in localization based on the configuration of localization sensors for ideal (e.g., indoor) conditions. It is with respect to these considerations and others that the various embodiments of the present invention have been made.

SUMMARY

As will be described in greater detail below, the instant disclosure generally relates to a docking station for the mechanical alignment of an autonomous robotic platform. In one example, the docking station may include (1) a base pad, (2) a correlator, coupled to the base pad, where the correlator includes a first set of members that (a) receive wheels of a moving autonomous robotic platform and (b) align the wheels in a substantially forward direction of travel on the base pad, and (3) a backstop, coupled to the base pad, where the backstop includes a second set of alignment members and a stopping member, where the second set of alignment members (a) receive the wheels of the moving autonomous robotic platform from the correlator on the base pad and (b) maintain the alignment of the wheels in the substantially forward direction of travel for engagement with the stopping member, where the stopping member is oriented vertically relative to the base pad at a height greater than a radius of the wheels of the moving autonomous robotic platform, and where the stopping member prevents further movement of the autonomous robotic platform.

In some examples, the base pad may include a low friction surface. In some examples, the first set of alignment members may include a frame and a roller attached to the frame. In some examples, the first set of alignment members may be oriented in a V-formation on the base pad.

In some embodiments, each of the second set of alignment members may include a frame and a roller attached to the frame. In some embodiments, stopping member may include a roller. In some embodiments, a set of charging contacts may be coupled to the base pad. In some embodiments, the set of charging contacts may be configured to charge the autonomous robotic platform at a charging station.

In some examples, the instant disclosure presents a system that includes a docking station with at least one of the features described above. In one example, the system may include a charging station for charging an autonomous robotic platform docked in the docking station via a set of charging contacts.

In some examples, the instant disclosure presents methods associated with mechanically aligning an autonomous robotic platform using a docking station. For example, a method may include (1) coupling a base pad to a correlator, where the correlator includes a first set of alignment members that (a) receives the wheels of a moving autonomous robotic platform and (b) aligns the wheels in a substantially forward direction of travel on the base pad and (2) coupling a backstop to the base pad where the backstop includes a second set of alignment members and a stopping member, where the second set of alignment members (a) receives the wheels of the moving autonomous robotic platform from the correlator on the base pad and (b) maintains the alignment of the wheels in the substantially forward direction of travel for engagement with the stopping member, where the stopping member is oriented vertically relative to the base pad at a height greater than a radius of the wheels of the moving autonomous robotic platform, and where the stopping member prevents further movement of the autonomous robotic platform.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

DETAILED DESCRIPTION

The present disclosure describes a variety of ways for reliably docking a wheeled autonomous robotic platform for charging when a localization estimate is either unavailable or is much greater than what may be needed for accurate docking by utilizing a mechanical docking station including a base pad, a correlator, and a backstop, which function together to guide the wheels of autonomous robotic platforms in a substantially forward direction of travel such that they may reliably and repeatedly engage with contacts for charging. Conventional docking stations for robotic platforms typically require the use of powered components which prevent docking operations during a power interruption. Furthermore, conventional docking stations typically require precise positioning of robotic platforms through the use of electronic (e.g., hardware and/or software) means for docking, and thus are susceptible to electromagnetic interference which may interfere with docking operations.

The embodiments of the disclosure described herein provide several advantages over traditional methods. The advantages include the ability to accurately maneuver an autonomous robotic platform to dock in a charging station without the use of powered components. Thus, an autonomous robotic platform would still be able to dock during a power outage to a docking station. Furthermore, the mechanical system of the embodiments described herein does not require precise positioning of an autonomous robotic platform through electronic (e.g., hardware and/or software) means for docking, is not susceptible to electromagnetic interference, and is relatively maintenance free. Moreover, the components of the aforementioned mechanical system may be implemented at a lower cost than high end electronic positioning hardware and software and is adaptable to nearly any type of wheeled robotic platform.

Embodiments of the disclosure now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
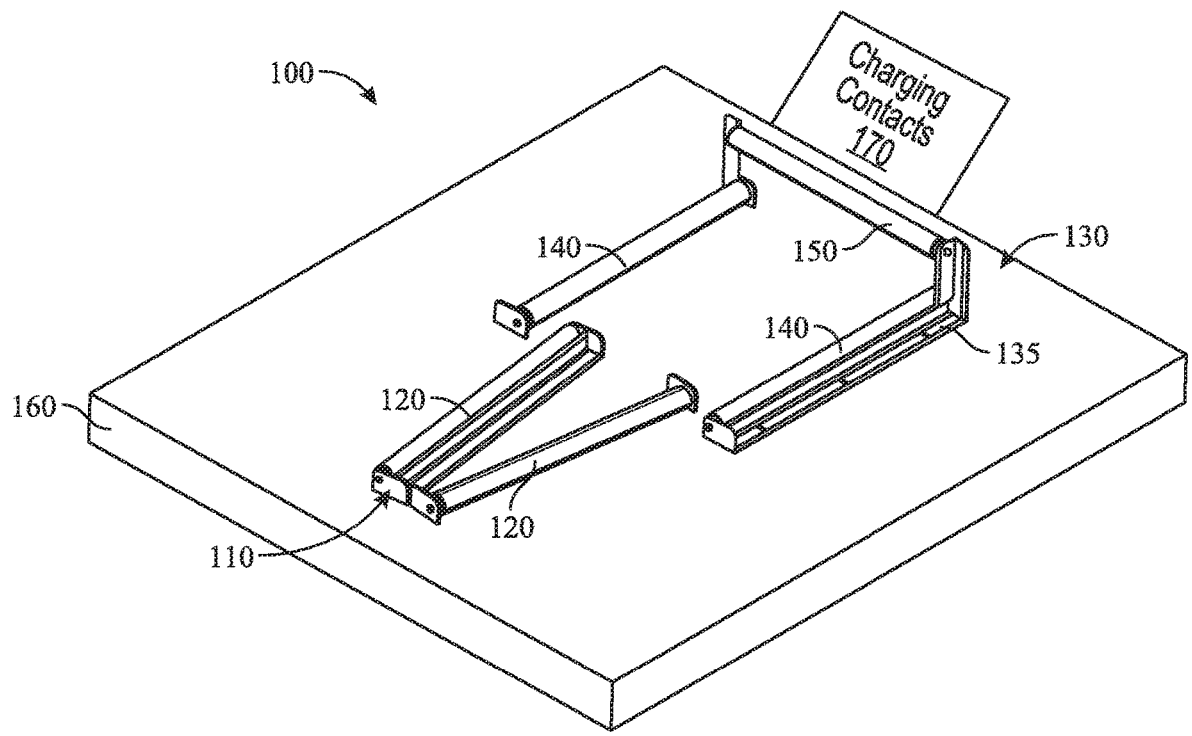
FIG. 1 illustrates a diagram of an example docking station for the mechanical alignment of an autonomous robotic platform, according to an example embodiment.

FIG. 1 illustrates a block diagram of an example docking station 100 for the mechanical alignment of an autonomous robotic platform. Docking station 100 may include a correlator 110, a backstop 130, and a base pad 160. Correlator 110 and backstop 130 may be coupled to base pad 160. Base pad 160 may further be coupled to charging contacts 170 that may be used to charge an autonomous robotic platform. In some examples, docking station 100 may be configured to maintain, store, and charge autonomous robotic platforms used for facility inspection (e.g., electrical substations, water utility facilities, etc.).

In some examples, correlator 110 may include two or more brackets, each of which holds a roller 120 utilized to align and correlate the wheels of an autonomous robotic platform into charging tracks (not shown) on base pad 160. In one example, the brackets holding rollers 120 may configured in a "V" formation so as to facilitate alignment of the wheels as the autonomous robotic platform travels over correlator 110 towards backstop 130. In this example, the width of the open end of the "V" formation may be slightly less than the wheel or axle track of the autonomous robotic platform such that the inner portion of each wheel may engage rollers 120 during travel over rollers 120 thereby maintaining alignment in the event of sliding or other lateral movement of the wheels due to tire conditions, surface conditions, etc. For example, the wheels of an autonomous robotic platform, after performing an outdoor facility inspection, may have accumulated water, mud, dirt, and/or gravel causing the wheel track of the platform to slip and slide laterally causing misalignment of the wheels during forward travel toward base pad 160 and correlator 110 on docking station 100. In this example, rollers 120 may assist in correcting and/or maintaining proper wheel alignment in a relatively forward direction as the autonomous robotic platform travels toward backstop 130 and charging contacts 170 for recharging operations.

In some examples, rollers 120 may be stainless steel rollers having a very low coefficient of friction to prevent the wheels of an autonomous robotic platform from gripping correlator 110 and climbing over it. In other examples, rollers 120 may be replaced with other materials having a low coefficient of friction such as TEFLON coated plates, a collection of small stainless steel bearing balls or beads, etc.

In some examples, the brackets holding rollers 120 of correlator 110 may take other shapes other than the "V" formation discussed above. For example, the brackets may form an inverse "A" formation, a curved formation, etc.

In some examples, backstop 130 may include a frame 135 holding longitudinal rollers 140 and transverse roller 150. Longitudinal rollers 140 may receive the wheels of a moving autonomous robotic platform from correlator 110 and maintain and/or further align the direction of travel towards transverse roller 150. Transverse roller 150 may be positioned at a height greater than a wheel radius of the platform. Upon contact with the moving platform, transverse roller 150 may provide a stopping force to prevent the platform from further forward movement while still allowing the wheels to rotate. Upon being stopped by transverse roller 150, the platform is accurately aligned with charging contacts 170 for charging operations.

As discussed above with respect to rollers 120 in correlator 110, longitudinal rollers 140 and transverse roller 150 may be implemented in a variety of ways. In some examples, longitudinal rollers 140 and transverse roller 150 may be stainless steel rollers having a very low coefficient of friction to prevent the wheels of an autonomous robotic platform from gripping backstop 130 and climbing over it. In other examples, longitudinal rollers 140 and transverse roller 150 may be replaced with other materials having a low coefficient of friction such as TEFLON coated plates, a collection of small stainless-steel bearing balls or beads, etc.

In some examples, base pad 160 may consist of the floor of docking station 100 and have a low friction surface. In one example, base pad 160 may be constructed from a sheet (e.g., a ¼ inch sheet) of Ultra-High-Molecular-Weight polyethylene (UHMW) so as to provide a strong, very low friction surface for an autonomous robotic platform to maneuver. The low friction of the UHMW surface may allow the wheels of skid steer autonomous robotic platform to slip laterally while correlator 110 aligns the wheels in docking station 100.

Figure 2A:
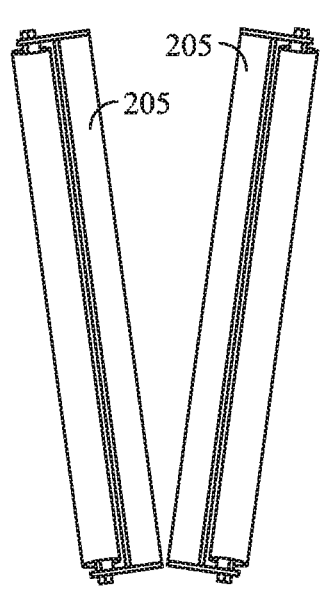
FIG. 2A illustrates a diagram of a correlator in the example docking station of FIG. 1, according to an example embodiment.
Figure 2B:
FIG. 2B illustrates a diagram of a roller that may be utilized in the correlator of FIG. 2A, according to an example embodiment.
Figure 2C:
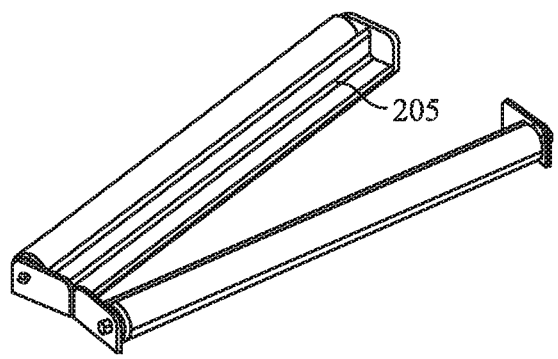
FIG. 2C illustrates a diagram of a correlator including a roller bracket in the example docking station of FIG. 1, according to an example embodiment.

FIG. 2A illustrates a diagram of a correlator in the example docking station 100 of FIG. 1, according to an example embodiment. For example, the correlator shown in 2A may correspond to correlator 110 discussed above with respect to FIG. 1. As shown in FIG. 2A, a correlator may include frames 205 (e.g., a roller bracket) for holding a roller 220 (as shown in FIG. 2B. FIG. 2C shows another view of frame 205 that may be utilized in a correlator. In some examples, the frames 205 shown in FIGS. 2A and 2C may be constructed from mild steel suitable for use in an outdoor environment.

Figure 3:
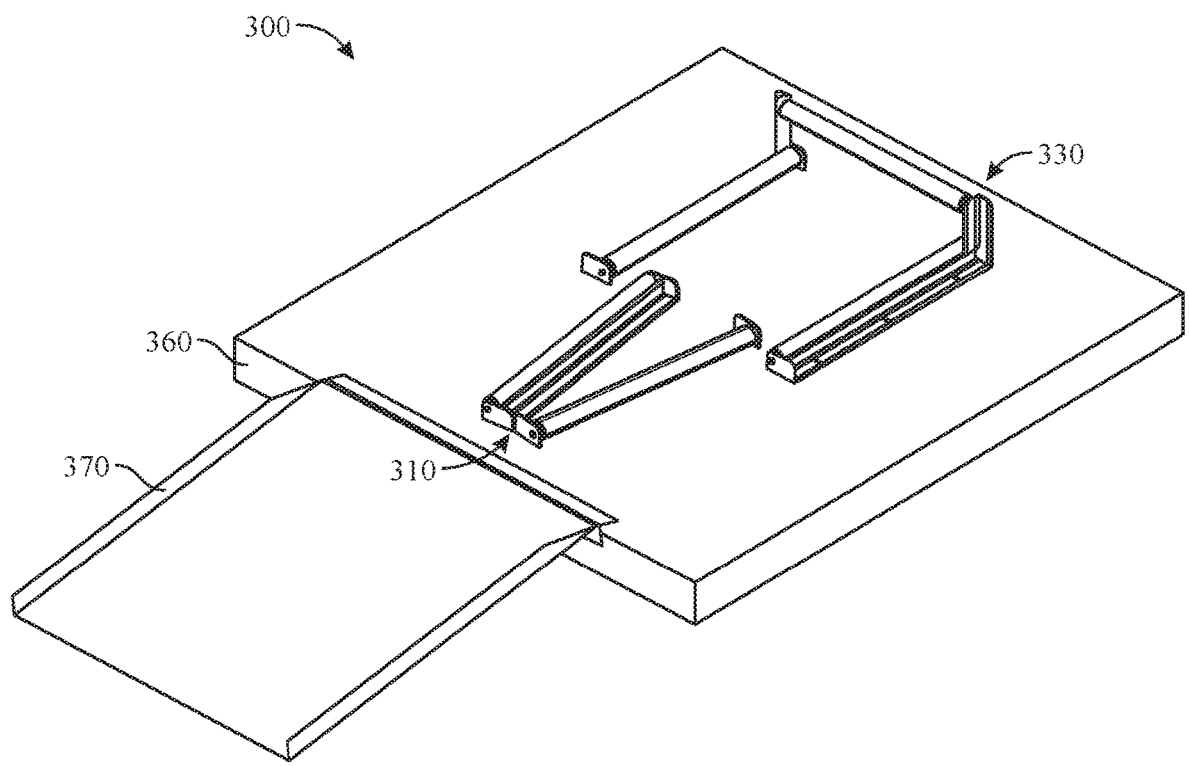
FIG. 3 illustrates a diagram of an example docking station for the mechanical alignment of an autonomous robotic platform, according to another example embodiment.

FIG. 3 illustrates a diagram of an example docking station 300 for the mechanical alignment of an autonomous robotic platform, according to another example embodiment. As shown in FIG. 3, docking station 300 includes a ramp 370 coupled to a base pad 360 (which may be similar to base pad 160 described above with respect to FIG. 1). In some examples, ramp 370 may be utilized by an autonomous robotic platform to facilitate travel onto base pad 360 for charging. Docking station 300 may further include a correlator 310 and a backstop 330, both of which may be coupled to base pad 360. Both correlator 310 and backstop 330 may be similar to correlator 110 and backstop 130 described above with respect to FIG. 1.

Figure 4:
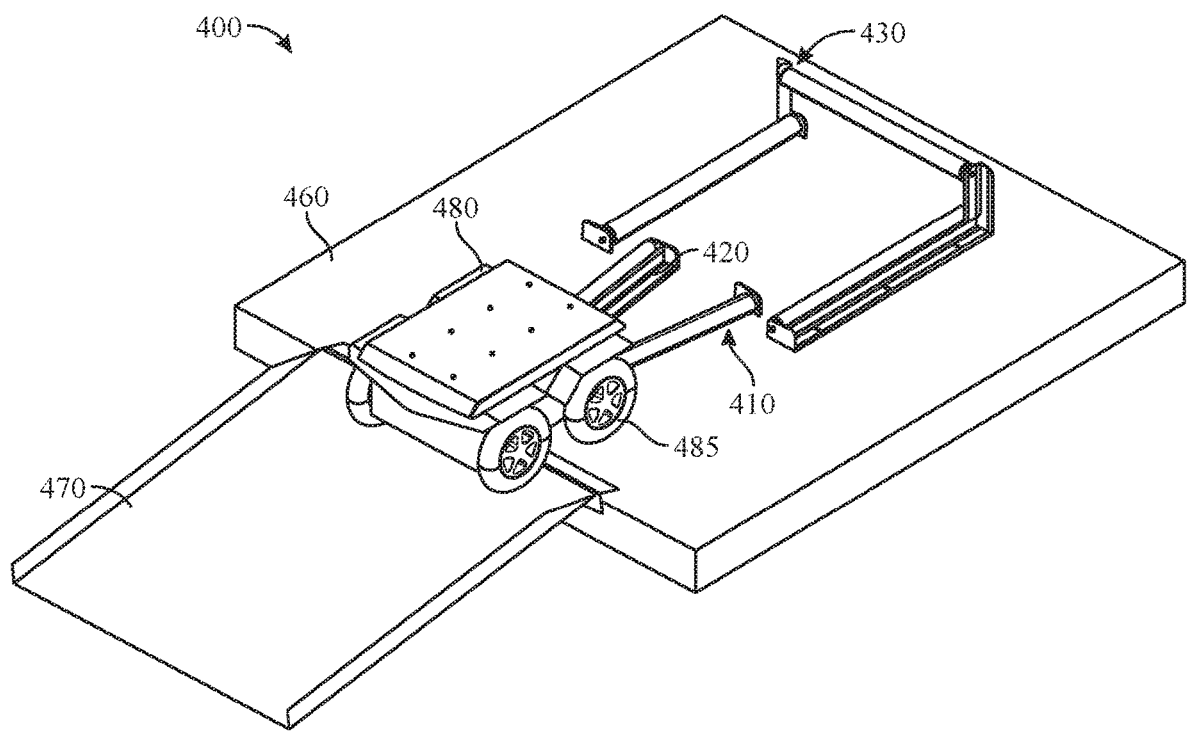
FIG. 4 illustrates a diagram of an example autonomous robotic platform utilizing a docking station for mechanical alignment, according to an example embodiment.

FIG. 4 illustrates a diagram of an example docking station 400 for the mechanical alignment of an autonomous robotic platform 480, according to another example embodiment. As shown in FIG. 4, docking station 400 includes a ramp 470 coupled to a base pad 460 (which may be similar to base pad 160 described above with respect to FIG. 1). A correlator 410 and a backstop 430 (which may be similar to correlator 110 and backstop 130 described above with respect to FIG. 1) may also be coupled to base pad 460. In some examples, ramp 470 may be utilized by wheels 485 of autonomous robotic platform 480 to facilitate travel onto base pad 460 and onto rollers 420 of correlator 410. As discussed above with respect to FIG. 1, the correlator rollers may be configured to align wheels 485 in a forward direction of travel as autonomous robotic platform 480 moves towards backstop 430.

Figure 5:
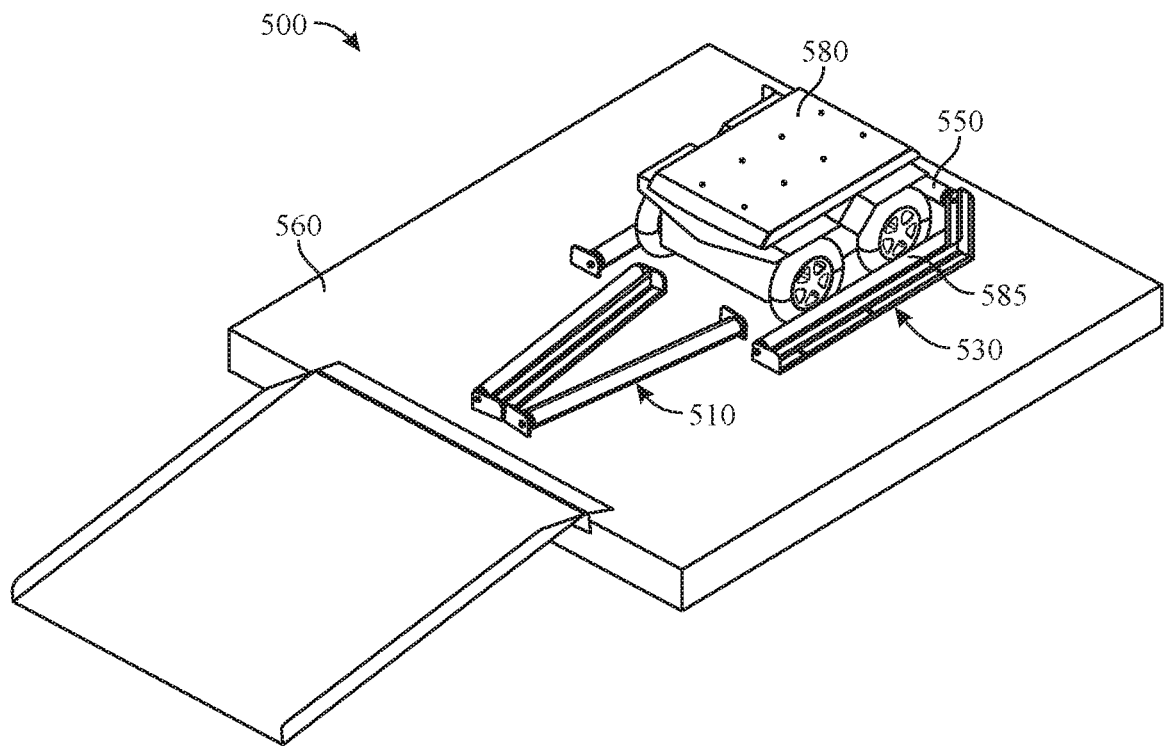
FIG. 5 illustrates a diagram of an example autonomous robotic platform docking with a docking station for mechanical alignment, according to an example embodiment.

FIG. 5 illustrates a diagram of an example docking station 500 for the mechanical alignment of an autonomous robotic platform 580, according to another example embodiment. As shown in FIG. 5, docking station 500 includes a base pad 560 (which may be similar to base pad 160 described above with respect to FIG. 1). A correlator 510 and a backstop 530 (which may be similar to correlator 110 and backstop 130 described above with respect to FIG. 1) may also be coupled to base pad 560. In some examples, transverse roller 550 attached to backstop 530 may be positioned at a height greater than a radius of wheels 585 on the platform. Upon contact with autonomous robotic platform 580, transverse roller 550 may provide a stopping force to prevent further forward movement while still allowing wheels 585 to rotate. Upon being stopped by transverse roller 550, autonomous robotic platform 580 may be accurately aligned for charging operations.

The term "autonomous robotic platform" as used herein, generally refers to any form of machine, programmable by a computer, capable of autonomously or semi-autonomously carrying out a complex series of actions or tasks such as facility inspections. Examples of programmable mobile machines include, without limitation, robots, aquatic mobility systems (e.g., autonomous surface vehicles), and/or surface-based mobility systems (e.g., unmanned ground vehicles (UGVs) including autonomous cars, etc.) that are capable of directional movement on the ground or on water.

The autonomous robotic platforms disclosed herein may be utilized in a variety of environments and conditions, including, for example facility substations (e.g., electrical and/or water utility substations), data centers, industrial environments (e.g., factories, plants, etc.), warehouses (e.g., storage warehouses, shipping warehouses, etc.), construction sites, buildings, outdoor spaces, and/or any other suitable environment or location, without limitation.

In some embodiments, a method for manufacturing, assembling, using, adjusting, or otherwise configuring or creating the docking station systems described herein may include (1) coupling a correlator and a backstop to a base pad where (a) the correlator includes a first group of alignment members configured to align wheels of a moving autonomous robotic platform to a substantially forward direction of travel on the base pad and (b) the backstop includes a second group of alignment members and a stopping member, where the second group of alignment members are configured to (i) receive the wheels of the moving autonomous robotic platform from the correlator on the base pad and (ii) align the wheels of the moving autonomous robotic platform to a substantially forward direction of travel for engagement with the stopping member and a plurality of charging contacts, where the stopping member is oriented laterally relative to the base pad, on which the backstop stands, and further oriented vertically at a height above a wheel radius of the moving autonomous robotic platform, and where the stopping member stops further forward movement of the autonomous robotic platform.

As discussed throughout the instant disclosure, the disclosed methods, systems, and devices may provide one or more advantages over traditional docking stations for autonomous robotic platforms. For example, by orienting alignment members on a low friction base pad such that autonomous robotic platforms may be mechanically guided for reliable docking with charging contacts at a charging station, the disclosed methods, systems, and devices may avoid the use of powered components utilized in positioning guidance systems and are further susceptible to power outages, electromagnetic interference, and potential high maintenance costs.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A docking station for the mechanical alignment of an autonomous robotic platform comprising:
   a base pad;

a correlator, coupled to the base pad, comprising a first plurality of alignment members that:
  receive wheels of a moving autonomous robotic platform; and
  mechanically align the wheels in a substantially forward direction of travel on the base pad without utilizing powered components, wherein each of the first plurality of alignment members comprises a frame and a roller attached to the frame, wherein the rollers assist in correcting a misalignment of the wheels causing the wheels to slip and slide laterally during the travel on the base pad; and
a backstop, coupled to the base pad, comprising a second plurality of alignment members and a stopping member, wherein the second plurality of alignment members:
  receive the wheels of the moving autonomous robotic platform from the correlator on the base pad; and
  maintain the alignment of the wheels in the substantially forward direction of travel for engagement with the stopping member, wherein the stopping member is oriented vertically relative to the base pad at a height greater than a radius of the wheels of the moving autonomous robotic platform, and wherein the stopping member prevents further movement of the autonomous robotic platform.

2. The docking station of claim 1, wherein the base pad comprises a low friction surface.

3. The docking station of claim 1, wherein the first plurality of alignment members are oriented in a V-formation on the base pad.

4. The docking station of claim 1, wherein each of the second plurality of alignment members comprises a frame and a roller attached to the frame.

5. The docking station of claim 1, wherein the stopping member comprises a roller.

6. The docking station of claim 1, wherein a plurality of charging contacts are coupled to the base pad.

7. The docking station of claim 6, wherein the plurality of charging contacts are configured to charge the autonomous robotic platform at a charging station.

8. A system comprising:
  a docking station that comprises:
    a base pad;
    a correlator, coupled to the base pad, comprising a first plurality of alignment members that:
      receive wheels of a moving autonomous robotic platform; and
      mechanically align the wheels in a substantially forward direction of travel on the base pad without utilizing powered components, wherein each of the first plurality of alignment members comprises a frame and a roller attached to the frame, wherein the rollers assist in correcting a misalignment of the wheels causing the wheels to slip and slide laterally during the travel on the base pad; and
    a backstop, coupled to the base pad, comprising a second plurality of alignment members and a stopping member, wherein the second plurality of alignment members:
      receive the wheels of the moving autonomous robotic platform from the correlator on the base pad; and
      maintain the alignment of the wheels in the substantially forward direction of travel for engagement with the stopping member, wherein the stopping member is oriented vertically relative to the base pad at a height greater than a radius of the wheels of the moving autonomous robotic platform, and wherein the stopping member prevents further movement of the autonomous robotic platform; and
  a charging station in electrical communication with the docking station, via a plurality of charging contacts.

9. The system of claim 8, wherein the base pad comprises a low friction surface.

10. The system of claim 8, wherein the first plurality of alignment members are oriented in a V-formation on the base pad.

11. The system of claim 8, wherein each of the second plurality of alignment members comprises a frame and a roller attached to the frame.

12. The system of claim 8, wherein the stopping member comprises a roller.

13. The system of claim 8, wherein the plurality of charging contacts are coupled to the base pad.

14. A method comprising:
  coupling a base pad to a correlator, wherein the correlator comprises a first plurality of alignment members that receive wheels of a moving autonomous robotic platform and mechanically aligns the wheels in a substantially forward direction of travel on the base pad without utilizing powered components, wherein each of the first plurality of alignment members comprises a frame and a roller attached to the frame, wherein the rollers assist in correcting a misalignment of the wheels causing the wheels to slip and slide laterally during the travel on the base pad; and
  coupling a backstop to the base pad wherein the backstop comprises a second plurality of alignment members and a stopping member, wherein the second plurality of alignment members receives the wheels of the moving autonomous robotic platform from the correlator on the base pad and maintains the alignment of the wheels in the substantially forward direction of travel for engagement with the stopping member, wherein the stopping member is oriented vertically relative to the base pad at a height greater than a radius of the wheels of the moving autonomous robotic platform, and wherein the stopping member prevents further movement of the autonomous robotic platform.

15. The method of claim 14, wherein the base pad, the correlator, and the backstop define a docking station for the moving autonomous robotic platform.

16. The method of claim 14, wherein the base pad comprises a low friction surface.

17. The method of claim 14, wherein the first plurality of alignment members are oriented in a V-formation on the base pad.

* * * * *